(12) United States Patent
Yoon et al.

(10) Patent No.: US 11,656,154 B2
(45) Date of Patent: May 23, 2023

(54) METHOD OF MATCHING WHEEL AND TIRE

(71) Applicants: Hyundai Motor Company, Seoul (KR); Kia Corporation, Seoul (KR); Foundation for Research and Business, Seoul National University of Science and Technology, Seoul (KR)

(72) Inventors: Young Sam Yoon, Hwaseong-si (KR); Ji Su Park, Gyeonggi-do (KR); Ki Ho Yum, Seoul (KR); Sung Dae Kim, Gyeonggi-do (KR); Kyu Ho Sim, Seoul (KR)

(73) Assignees: Hyundai Motor Company, Seoul (KR); Kia Corporation, Seoul (KR); Foundation for Research and Business, Seoul National University of Science and Technology, Seoul (KR)

( * ) Notice: Subject to any disclaimer, the term of this patent is extended or adjusted under 35 U.S.C. 154(b) by 29 days.

(21) Appl. No.: 17/473,369

(22) Filed: Sep. 13, 2021

(65) Prior Publication Data

US 2022/0316987 A1 Oct. 6, 2022

(30) Foreign Application Priority Data

Mar. 30, 2021 (KR) .......................... 10-2021-0041244

(51) Int. Cl.
*G01M 17/02* (2006.01)
*G06F 17/18* (2006.01)

(52) U.S. Cl.
CPC ............. *G01M 17/02* (2013.01); *G06F 17/18* (2013.01)

(58) Field of Classification Search
CPC ...... G06F 17/18; G01M 17/013; G01M 17/02
See application file for complete search history.

(56) References Cited

U.S. PATENT DOCUMENTS

2002/0100321 A1* 8/2002 Douglas .............. G01M 17/022
73/461
2018/0313723 A1* 11/2018 Oblizajek ........... G01M 17/027

FOREIGN PATENT DOCUMENTS

| KR | 2007-0039107 A | 4/2007 |
| KR | 101283426 B1 | 7/2013 |
| KR | 2016-0060806 A | 5/2016 |
| KR | 101637737 B1 | 7/2016 |

* cited by examiner

*Primary Examiner* — Natalie Huls
*Assistant Examiner* — Cynthia L Davis
(74) *Attorney, Agent, or Firm* — Fox Rothschild LLP

(57) ABSTRACT

A method of matching a wheel and a tire includes steps of: measuring inner runout and outer runout of a wheel; extracting and setting a primary component of a measurement waveform of the inner runout as an inner runout waveform and extracting and setting a primary component of a measurement waveform of the outer runout as an outer runout waveform; comparing an inner minimum value that is a minimum value of the inner runout waveform and an outer minimum value that is the minimum value of the outer runout waveform with a predetermined runout reference value; and determining an assembly reference position of the wheel based on the inner minimum value or the outer minimum value or based on a resultant waveform of the inner runout waveform and the outer runout waveform, depending on a result of the comparing step.

9 Claims, 12 Drawing Sheets

METHOD OF MATCHING WHEEL AND TIRE

CROSS REFERENCE TO RELATED APPLICATION

The present application claims under 35 U.S.C. § 119(a) the benefit of Korean Patent Application No. 10-2021-0041244, filed Mar. 30, 2021, the entire contents of which are incorporated by reference herein.

BACKGROUND

(a) Technical Field

The present disclosure relates to a method of matching a wheel and a tire of a vehicle.

(b) Description of the Related Art

A tire and a wheel should ideally be manufactured to have a uniform characteristic in a circumferential direction, but most tires and wheels are substantially produced with slight imbalances.

In consideration of these imbalances, a position where a Radial Force Variation (RFV) is maximum and a position where runout of a wheel is minimum are matched in the circumferential direction of a tire when the tire and a wheel are combined, thereby minimizing circumferential unbalance of the entire assembly of the wheel and tire.

The description provided above as a related art of the present disclosure is just for helping understanding the background of the present disclosure and should not be construed as being included in the related art known by those skilled in the art.

SUMMARY

An objective of the present disclosure is to provide a method of matching a wheel and a tire, in order to enable more accurate matching of a wheel and a tire so as to improve riding comfort for occupants of a vehicle by minimizing vibration or shaking while the vehicle equipped with matched wheels and tires is driven.

In order to achieve the objectives of the present disclosure, a method of matching a wheel and a tire includes the steps of: measuring inner runout and outer runout of a wheel; extracting and setting a primary component of a measurement waveform of the inner runout as an inner runout waveform and extracting and setting a primary component of a measurement waveform of the outer runout as an outer runout waveform; comparing an inner minimum value that is a minimum value of the inner runout waveform and an outer minimum value that is the minimum value of the outer runout waveform with a predetermined runout reference value; and determining an assembly reference position of the wheel based on the inner minimum value or the outer minimum value or based on a resultant waveform of the inner runout waveform and the outer runout waveform, depending on a result of the comparing step.

In a wheel and tire assembly formed by combining the wheel and the tire, the assembly reference position of the wheel is matched with the position of a maximum RFV of the tire.

When both of the inner minimum value and the outer minimum value are greater than or equal to the runout reference value, the assembly reference position of the wheel may be determined as the position of the minimum value of the resultant waveform of the inner runout waveform and the outer runout waveform.

When both of the inner minimum value and the outer minimum value are less than the runout reference value, the assembly reference position of the wheel may be determined as a position of a larger one of the inner minimum value and the outer minimum value.

When only one of the inner minimum value and the outer minimum value is greater than or equal to the runout reference value, the assembly reference position of the wheel may be determined as the position of the one, which is greater than or equal to the runout reference value, of the inner minimum value and the outer minimum value.

For the runout reference value, an error function that is determined by reflecting an error of a measurement device that measures the inner runout and the outer runout is obtained; virtual wheel and tire assemblies are formed by combining several virtual wheel samples according to the error function with a predetermined tire model; and a simulation for obtaining RFVs of the virtual wheel and tire assemblies is applied to all the virtual wheel and tire assemblies while a predetermined temporary runout reference value is changed, whereby the temporary runout reference value at which an average value of the RFVs of the virtual wheel and tire assemblies becomes minimum may be determined as the runout reference value.

The error function may be obtained by: obtaining several inner minimum values obtained by measuring runout of several wheels through the measurement device and a standard deviation of phase angles thereof, outer minimum values and a standard deviation of phase angles thereof, and minimum values of the resultant waveforms and a standard deviation of phase angles thereof, showing all of the values on a coordinate plane composed of the magnitude of runout and a standard deviation of phase angles; and deriving a regression curve for points shown on the coordinate plane.

The several virtual wheel samples may be created as many as a predetermined number such that an average and a standard deviation of each of the inner minimum values and the outer minimum values follow normal distribution with predetermined reference average and reference standard deviation.

In the several virtual wheel samples, the phase angles of the inner minimum values may be fixed at 0° and the phase angles of the outer minimum values may be randomly set within the range of 0°~360°.

The several virtual wheel samples according to the error function may have phase angles corrected by obtaining a standard deviation of phase angles, which are obtained by substituting runout of the virtual wheel samples into the error function, and then adding random phase angles, which are randomly determined within the standard deviation, to phases of the virtual wheel samples.

The tire model for configuring the virtual wheel and tire assemblies by being combined with the virtual wheel samples may have a constant reference RFV.

According to the present disclosure, it is possible to enable more accurate matching of a wheel and a tire to improve riding comfort for occupants of a vehicle by minimizing vibration or shaking while the vehicle equipped with matched wheels and tires is driven.

In particular, it is possible to more accurately determine a matching point of a wheel and a tire in consideration of an error according to the characteristic of a measurement device that measures runout of a wheel when matching the wheel and the tire.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

Figure 1:
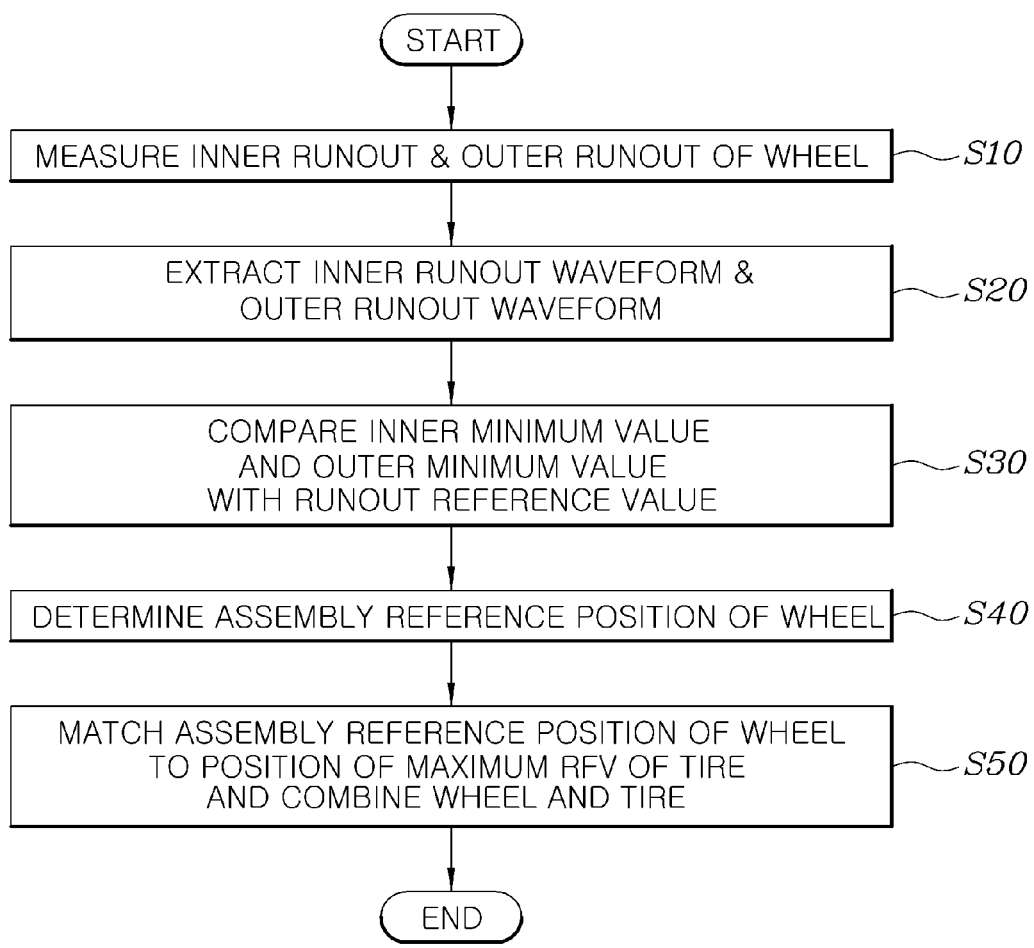
FIG. 1 is a flowchart showing an embodiment of a method of matching a wheel and a tire according to the present disclosure.
Figure 2:
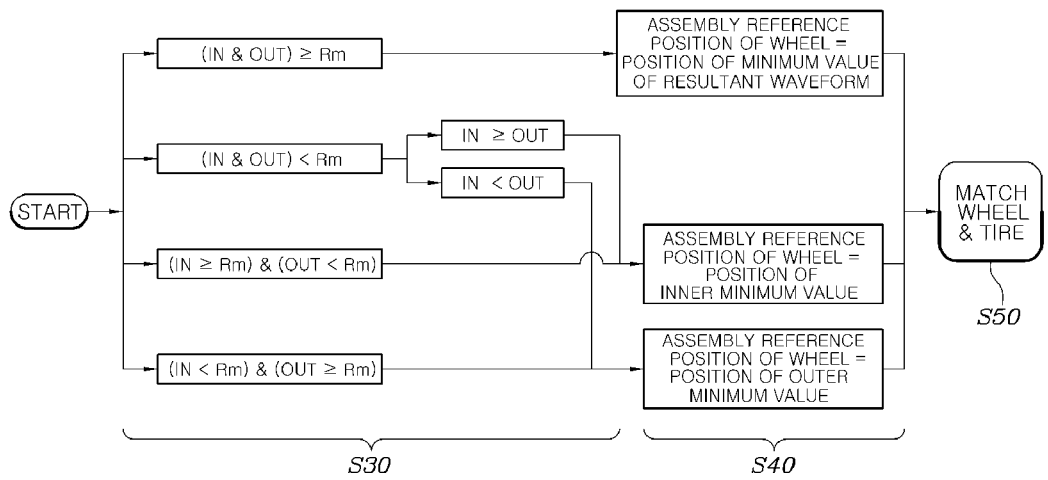
FIG. 2 is a diagram showing in detail a method of determining an assembly reference position of a wheel by comparing an inner minimum value and an outer minimum value with a runout reference value in FIG. 1.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and may have various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

The present disclosure will be described hereafter in detail by describing exemplary embodiments of the present disclosure with reference to the accompanying drawings. Like reference numerals given in the drawings indicate like components.

Referring to FIG. 1, a method of matching a wheel and a tire of the present disclosure includes: measuring inner runout and outer runout of a wheel (S10); extracting and setting a primary component of a measurement waveform of the inner runout as an inner runout waveform W_IN and extracting and setting a primary component of a measurement waveform of the outer runout as an outer runout waveform W_OUT (S20); comparing an inner minimum value IN that is the minimum value of the inner runout waveform W_IN and an outer minimum value OUT that is the minimum value of the outer runout waveform W_OUT with a predetermined runout reference value Rm (S30); and determining an assembly reference position of the wheel based on the inner minimum value IN or the outer minimum value OUT or based on a resultant waveform AVG of the inner runout waveform W_IN and the outer runout waveform W_OUT, depending on a comparing result (S40).

That is, according to the present disclosure, it is possible to individually measure inner runout and outer runout of a wheel, obtain the inner minimum value IN and the outer minimum value OUT using the measured data, compare the inner and outer minimum values with a predetermined runout reference values Rm, and appropriately determine an assembly reference position of the wheel in accordance with the comparing result.

Obviously, a wheel and tire assembly is formed by combining the wheel and a tire after the assembly reference position of the wheel is determined. The wheel and tire assembly is formed such that the assembly reference position of the wheel and the position of the maximum Radial Force Variation (RFV) of the tire are matched to each other.

Accordingly, since the position where the dominant runout of the wheel is minimum and the position where the RFV of the tire is maximum are matched to each other, the wheel and tire assembly has a maximum and uniform circumferential physical characteristic. Accordingly, when a vehicle equipped with the wheel and tire assembly is driven, unnecessary vibration is minimized, so riding comfort of the vehicle can be improved.

The primary component of the inner runout waveform W_IN is extracted and obtained by applying Fourier transform to the inner runout measurement waveform and the primary component of the outer runout waveform W_OUT is extracted and obtained by applying Fourier transform to the outer runout measurement waveform.

Accordingly, the inner minimum value IN is determined as the minimum value of the primary component graph obtained by applying Fourier transform to the inner runout measurement waveform, and the outer minimum value OUT is determined as the minimum value of the primary component graph obtained by applying Fourier transform to the outer runout measurement waveform.

Figure 3:
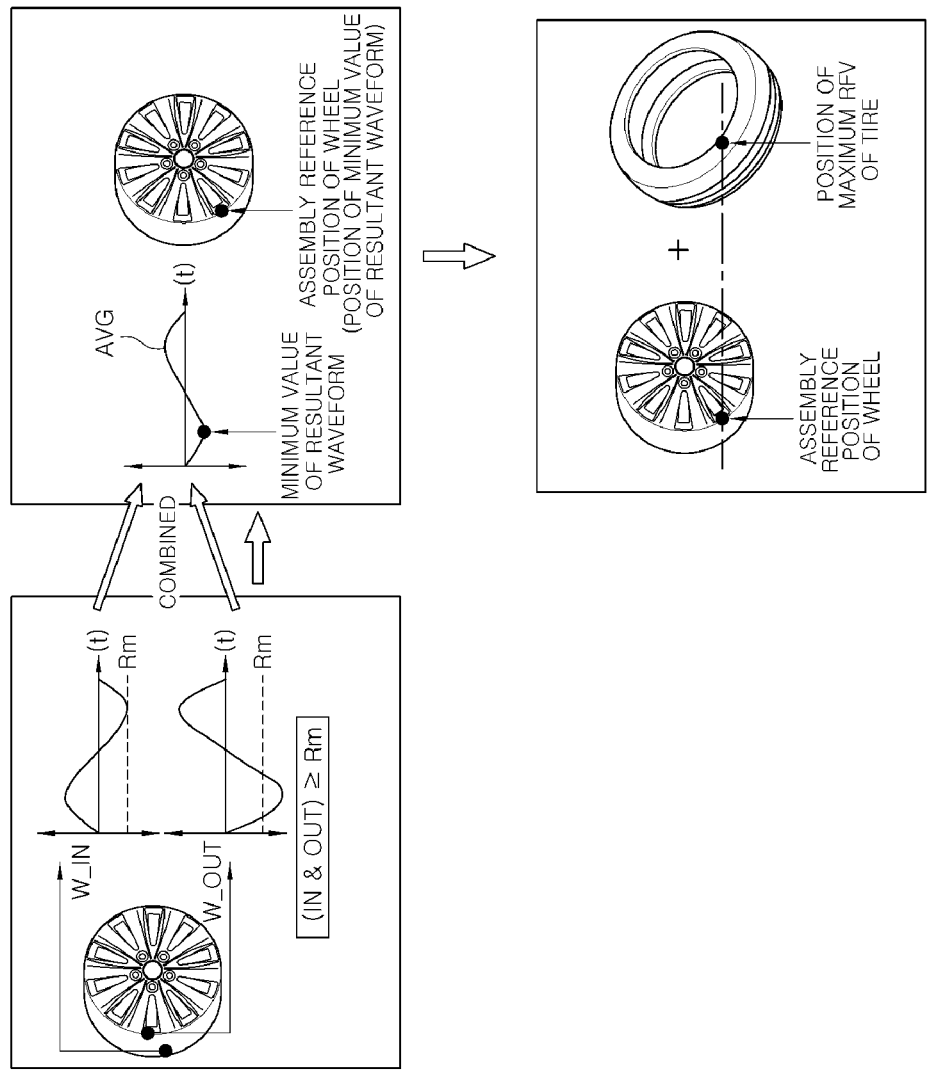
FIG. 3 is a diagram showing matching of a wheel and a tire when both of an inner minimum value and an outer minimum value are a runout reference value or more.

In comparing the inner minimum value IN and the outer minimum value OUT with the runout reference value Rm (S30) and the determining of an assembly reference position of the wheel, depending on the comparing result (S40), as shown in FIGS. 2 to 5, when both of the inner minimum value IN and the outer minimum value OUT are the runout reference value Rm or more, the assembly reference position of the wheel is determined as the position of the minimum value of a resultant waveform AVG of the inner runout waveform W_IN and the outer runout waveform W_OUT (see FIG. 3).

When both of the inner minimum value IN and the outer minimum value OUT are less than the runout reference value Rm, the assembly reference position of the wheel is determined as the position of the larger one of the inner minimum value IN and the outer minimum value OUT.

The inner minimum value IN and the outer minimum value OUT may be the same, and in this case, as shown in the figures, the assembly reference position of the wheel may be determined as the position of the inner minimum value IN.

When only one of the inner minimum value IN and the outer minimum value OUT is the runout reference value Rm or more, the assembly reference position of the wheel is determined as the position of the one, which is the runout reference value Rm or more, of the inner minimum value IN and the outer minimum value OUT.

That is, the position of the larger one of the inner minimum value IN and the outer minimum value OUT is determined as the assembly reference position of the wheel, but when both of the inner minimum value IN and the outer minimum value OUT are the runout reference value Rm or more, the minimum value of the resultant waveform AVG is determined as the assembly reference position of the wheel.

Figure 4:
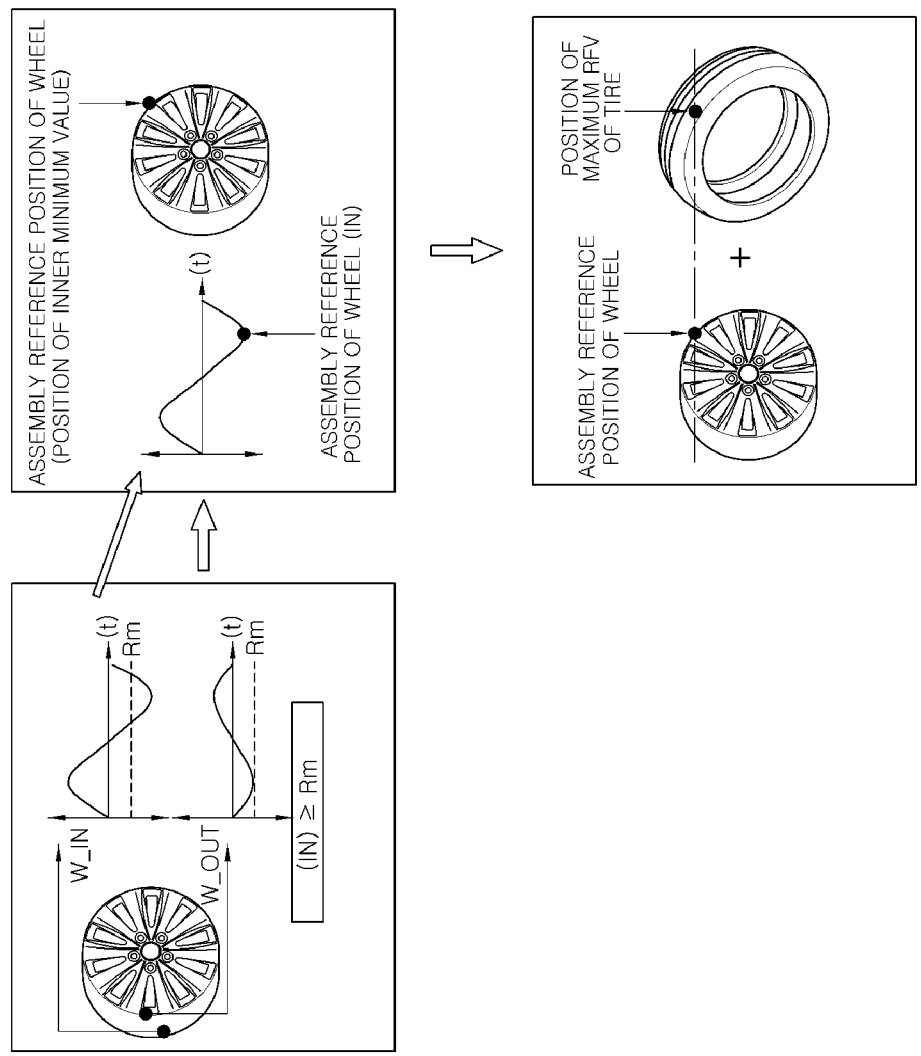
FIG. 4 is a diagram showing matching of a wheel and a tire when an inner minimum value is a runout reference value or more.
Figure 5:
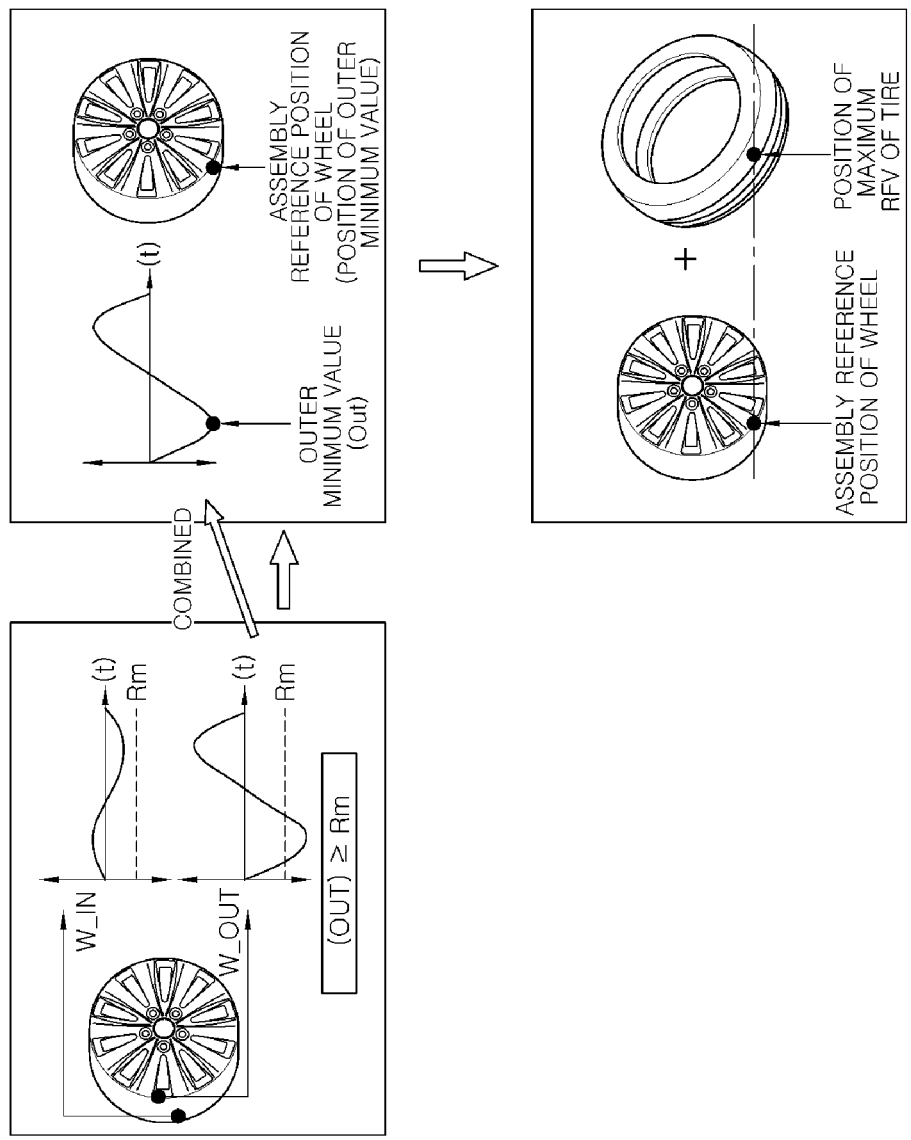
FIG. 5 is a diagram showing matching of a wheel and a tire when an outer minimum value is a runout reference value or more.

Comparing the inner minimum value IN and the outer minimum value OUT with the runout reference value Rm, as shown in FIGS. 3 to 5, the runout reference value Rm is shown under the inner runout waveform W_IN or the outer runout waveform W_OUT and is considered as a negative number, so there may be confusion when the magnitudes are compared.

Accordingly, as shown in FIGS. 3 to 5, when the minimum value of the inner runout waveform W_IN or the outer runout waveform W_OUT exceeds the runout reference value Rm and is positioned lower, it is determined that the inner minimum value IN or the outer minimum value OUT is larger than the runout reference value Rm.

For reference, the resultant waveform AVG is obtained by adding up one cycle of the inner runout waveform W_IN and one cycle of the outer runout waveform W_OUT at each position (see FIG. 3).

For the runout reference value RM, an error function that is determined by reflecting an error of a measurement device that measures the inner runout and the outer runout is obtained; virtual wheel and tire assemblies are formed by combining several virtual wheel samples according to the error function with a predetermined tire model; and a simulation for obtaining RFVs of the virtual wheel and tire assemblies is applied to all the virtual wheel and tire assemblies while a predetermined temporary runout reference value Rm is changed, whereby the temporary runout reference value Rm at which the average value of the RFVs of the virtual wheel and tire assemblies becomes minimum is determined as the runout reference value Rm.

That is, the runout reference value Rm is used to consequently enable an assembly reference position of a wheel, which enables the RFV of a wheel and tire assembly to be minimized, to be determined while considering the error characteristic of the measurement device.

The error function can be obtained by: obtaining several inner minimum values IN obtained by measuring runout of several wheels through the measurement device and the standard deviation of the phase angles thereof, outer minimum values OUT and the standard deviation of the phase angles thereof, and the minimum values of the resultant waveforms AVG and the standard deviation of the phase angles thereof, showing all of the values on a coordinate plane composed of the magnitude of runout and the standard variation of phase angles; and deriving a regression curve for the points shown on the coordinate plane.

Figure 6:
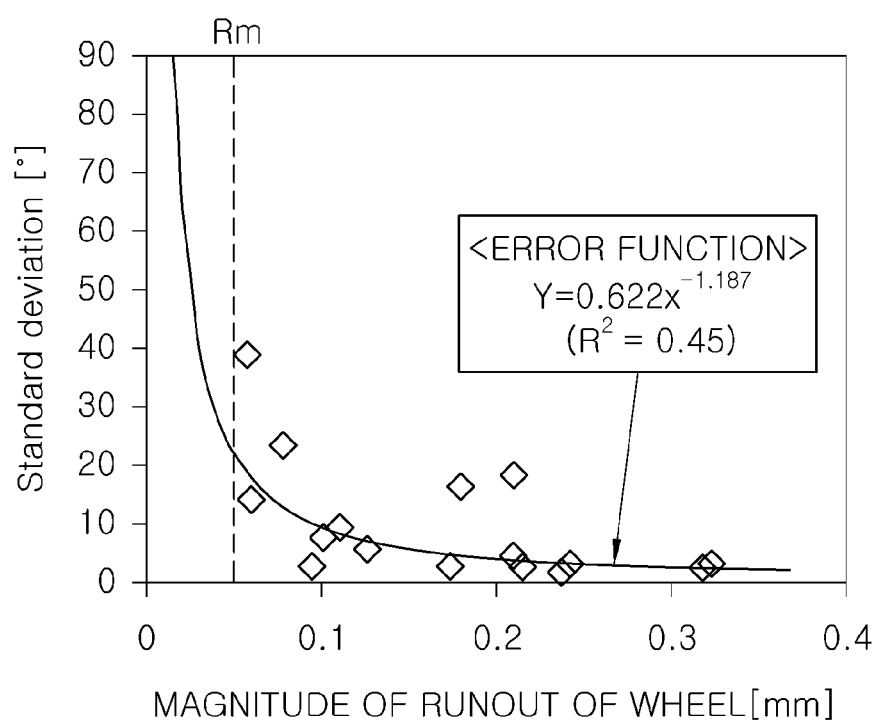
FIG. 6 is a diagram showing an example of an error function.

FIG. 6 shows an example of obtaining an error function using the method described above, in which several wheels of 17-in, 18-in, and 19-in wheels were prepared for each runout level, the inner minimum value IN and the phase angle thereof, the outer minimum value OUT and the phase angle thereof, and the position of the minimum value of the resultant waveform AVG and the phase angle thereof were measured at least over 100 times and derived through the method described above.

The several virtual wheel samples are created as many as a predetermined number such that the average and standard deviation of each of the inner minimum values IN and the outer minimum values OUT follow normal distribution with predetermined reference average and reference standard deviation.

Figure 7:
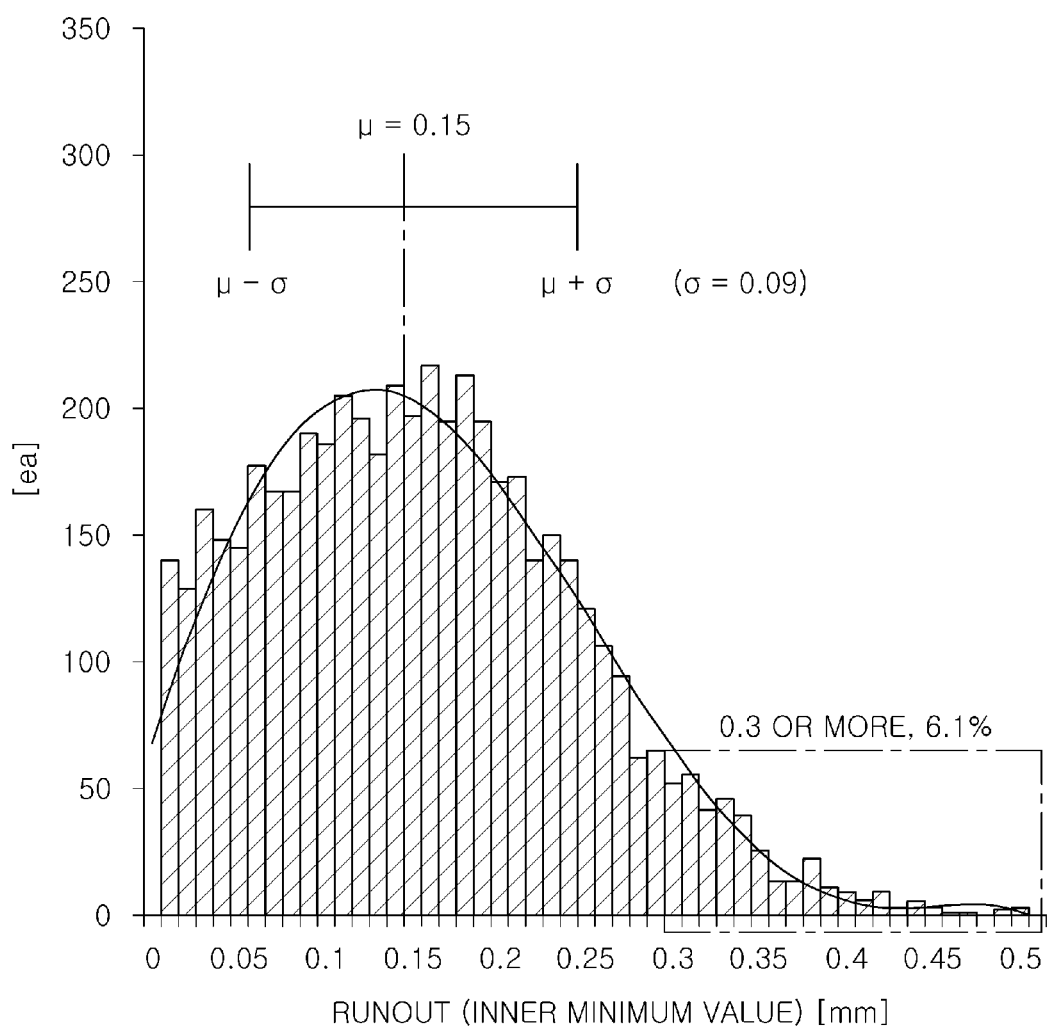
FIG. 7 is an exemplary histogram showing 5000 virtual wheel samples when inner minimum values follow nominal distribution.

For example, FIG. 7 is a histogram showing 5000 virtual wheel samples following normal distribution in which the average of inner minimum value IN is 0.15 mm and the standard deviation is 0.09 mm. Referring to FIG. 7, assuming that the cases with runout of 0.3 mm or less is good products, about 94% virtual wheel samples are good products because virtual wheel samples having runout of 0.3 mm or more is about 6.1%. Accordingly, it is possible to determine that the population of the virtual wheel samples has runout distribution to which actuality is reflected.

Figure 8:
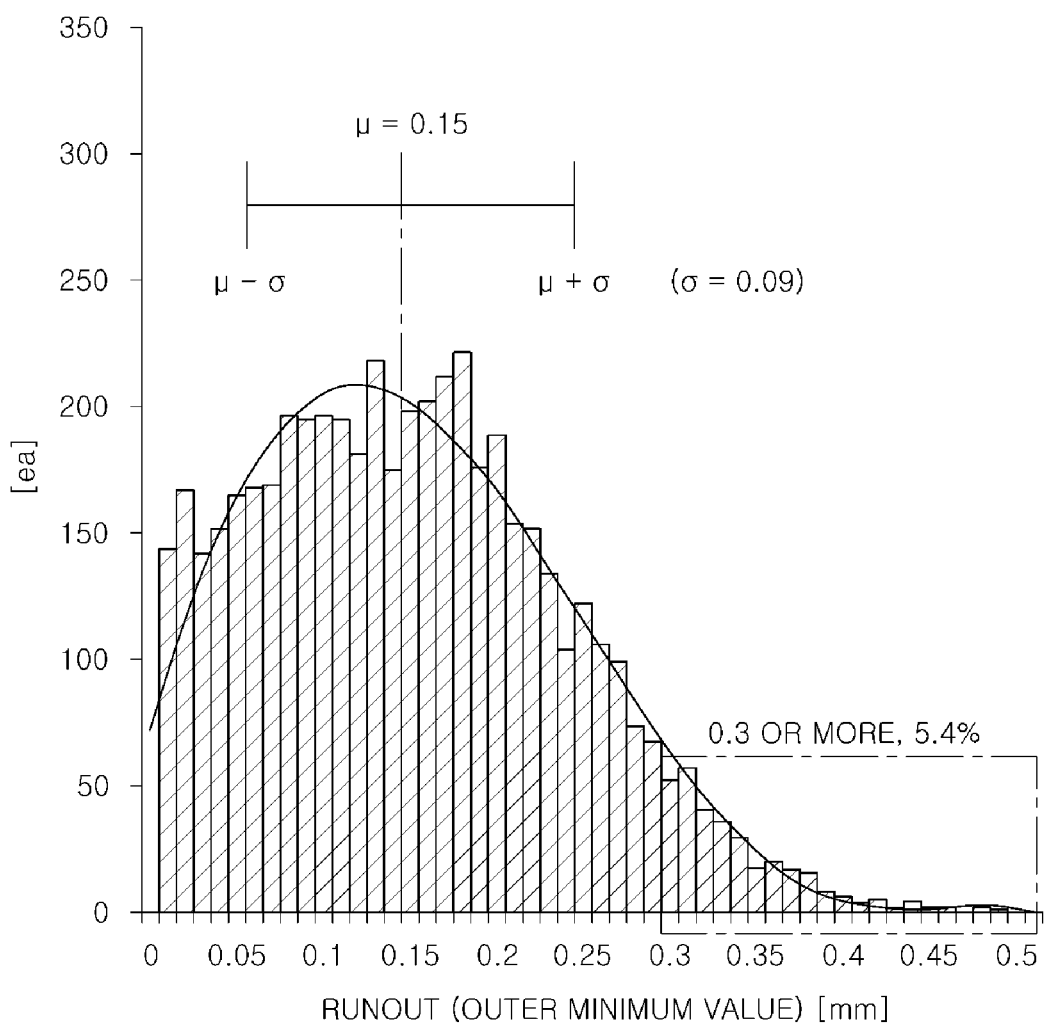
FIG. 8 is an exemplary histogram showing 5000 virtual wheel samples when outer minimum values follow nominal distribution.

Similarly, FIG. 8 is a histogram showing 5000 virtual wheel samples following normal distribution in which the average of outer minimum value OUT is 0.15 mm and the standard deviation is 0.09 mm. Referring to FIG. 8, assuming that the cases with runout of 0.3 mm or less is good products, about 94% or more virtual wheel samples are determined as good products because virtual wheel samples having runout of 0.3 mm or more is about 5.4%. Accordingly, it is possible to determine that the population of the virtual wheel samples has runout distribution to which actuality is reflected.

In the examples of FIGS. 7 and 8, the reference average is 0.15 mm and the reference standard deviation is 0.09 mm, and the reference average and the reference standard deviation may be appropriately changed in accordance with situations.

In the several virtual wheel samples, the phase angles of the inner minimum values IN are fixed at 0° and the phase angles of the outer minimum values OUT are randomly set within the range of 0°~360°.

Figure 9:
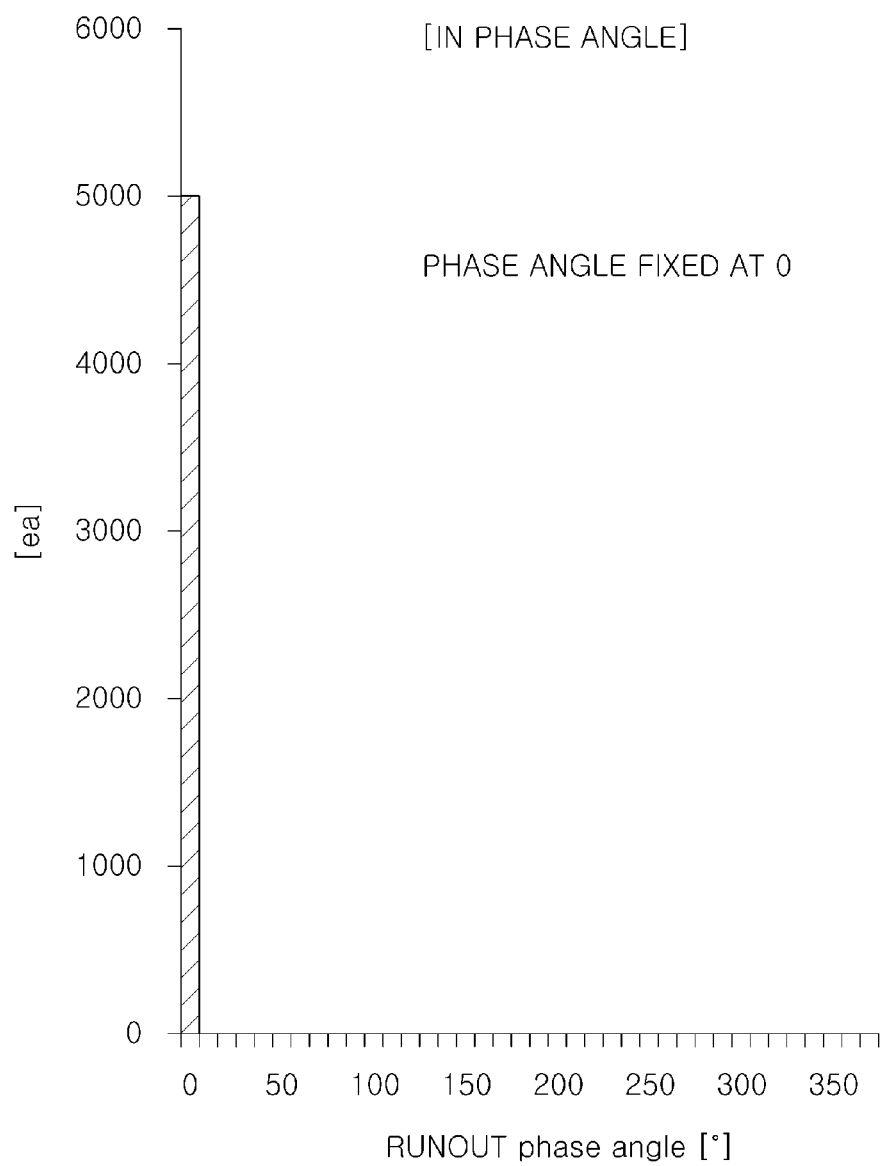
FIG. 9 is a graph showing 5000 virtual wheel samples when the phase angles of inner minimum values are fixed at 0°.
Figure 10:
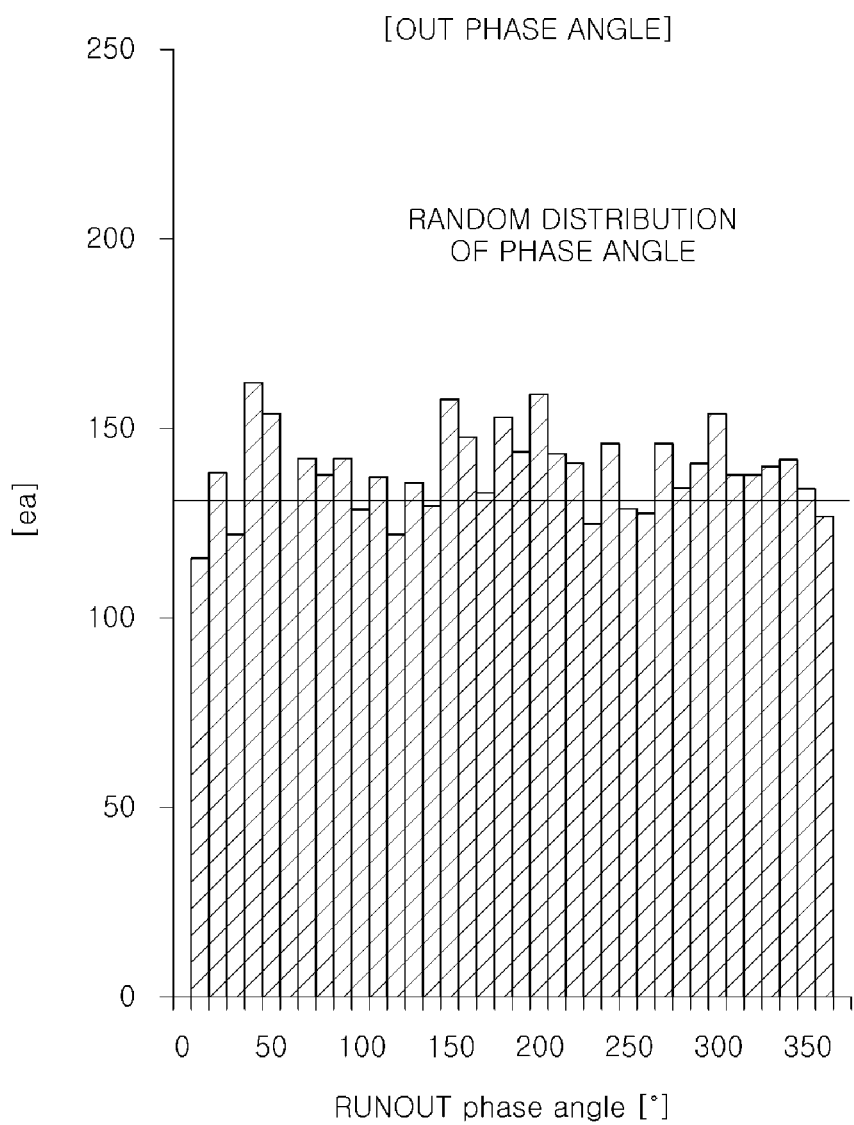
FIG. 10 is a graph showing 5000 virtual wheel samples when the phase angles of outer minimum values are randomly set within the range of 0~360°.

For example, as shown in FIGS. 9 and 10, for 5000 virtual wheel samples, the phase angles of the inner minimum values IN are all fixed at 0° and the phase angles of the outer minimum values OUT are randomly set within the range of 0°~360°, whereby about 140 virtual wheel samples can be uniformly distributed at each of the phase angles set with intervals of 10°.

This is because when only the phase angles of the outer minimum values OUT are changed with the phase angles of the inner minimum angles IN fixed at 0°, it is possible to easily make the distribution of phase differences uniform between the inner minimum angles IN and the outer minimum values OUT that are measured inside and outside the wheels.

Several virtual wheel samples according to an error function are obtained by applying the several virtual wheel samples configured as described above to the error function.

That is, the several virtual wheel samples according to the error function have phase angles corrected by obtaining the standard deviation of phase angles, which are obtained by substituting the runout of the virtual wheel samples into the error function, and then adding random phase angles, which are randomly determined within the standard deviation, to the phases of the virtual wheel samples.

For example, when any one of the several virtual wheel samples has runout (larger one of an inner minimum value IN and an outer minimum value) of 0.1 mm and a phase angle of 180°, a standard deviation of 27 is obtained by substituting the runout into the error function shown in FIG. 6, so the phase angle of the virtual wheel sample can be randomly determined within the range of 180°±27°. Accordingly, for example, the random phase angle is determined as 20°, this is added to the original phase angle of 180°, whereby the finally corrected phase angle becomes 200°.

When this process is applied to all virtual wheel samples, several virtual wheel samples according to the error function are obtained. Further, virtual wheel and tire assemblies are configured by matching the virtual wheel samples to the tire model and a simulation for obtaining the RFVs of the virtual wheel and tire assemblies is applied to all the virtual wheel and tire assemblies.

The tire model for configuring the virtual wheel and tire assemblies by being combined with the virtual wheel samples is given a constant reference RFV.

For example, the reference RFV of the tire mode may be set as 6.0 kgf.

Figure 11:
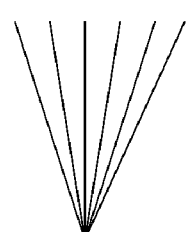
FIG. 11 is a diagram conceptually showing matching of a fire model and virtual wheel samples according to an error function.

FIG. 11 is a diagram conceptually showing matching of the tire model described above and the virtual wheel samples according to the error function.

The simulation is used to obtain the RFVs of all the virtual wheel and tire assemblies while changing a predetermined temporary runout reference value Rm, in which the temporary runout reference value Rm at which the average value of the RFVs of the virtual wheel and tire assemblies is minimum is determined as the runout reference value Rm.

Figure 12:
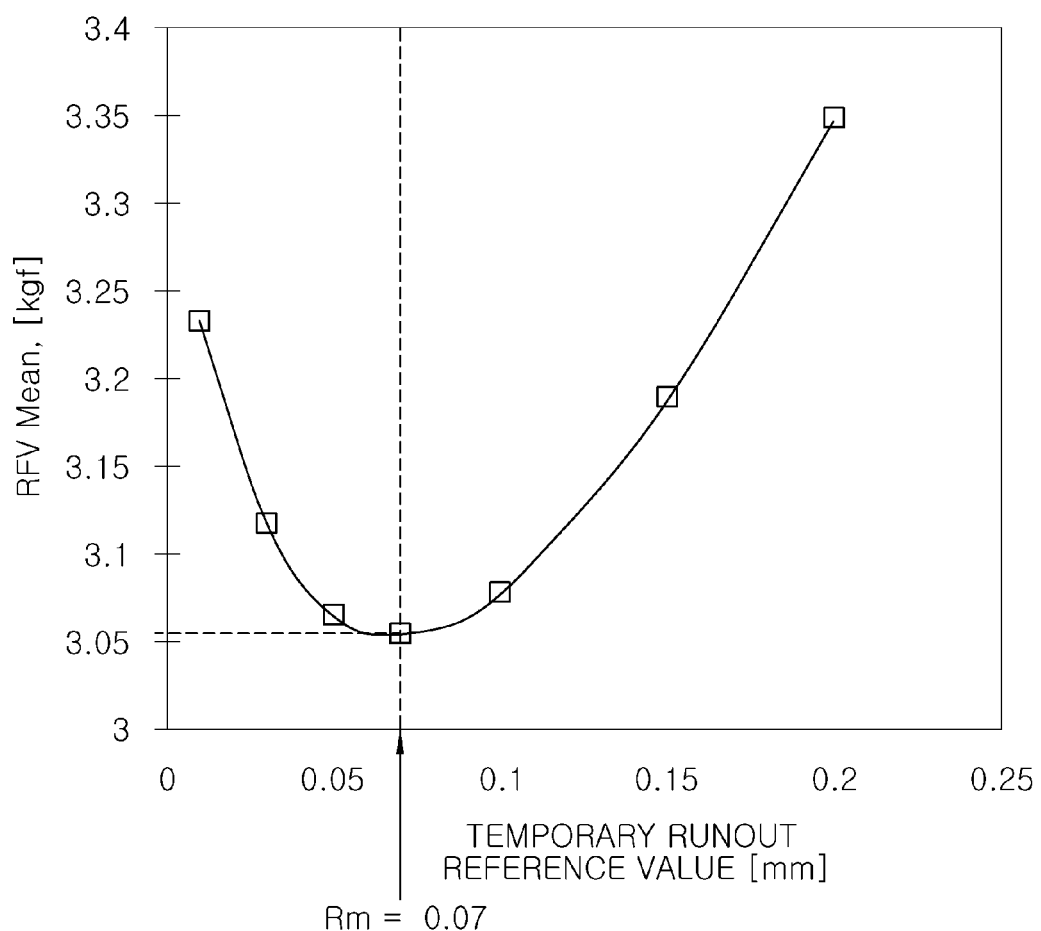
FIG. 12 is a graph showing an average value of RFVs of all virtual wheel and fire assemblies when a temporary runout reference value (Rm) changes.

For example, FIG. 12 is a graph showing an average value of RFVs of all virtual wheel and tire assemblies when a temporary runout reference value (Rm) changes in accordance with the simulation described above, in which it can be seen that the temporary runout reference value Rm becomes minimum at about 0.07, and in this case, the runout reference value Rm is 0.07.

As can be expected from FIG. 12, the runout reference value Rm can be determined as a plurality of values appropriately determined within a range of a very small value, such as about 0.01 mm, and about 0.2 mm, but is not limited thereto.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. A method of matching a wheel and a tire, comprising the steps of:
measuring inner runout and outer runout of a wheel;
extracting and setting a primary component of a measurement waveform of the inner runout as an inner runout waveform and extracting and setting a primary component of a measurement waveform of the outer runout as an outer runout waveform;
comparing an inner minimum value that is a minimum value of the inner runout waveform and an outer minimum value that is the minimum value of the outer runout waveform with a predetermined runout reference value; and
determining an assembly reference position of the wheel based on the inner minimum value or the outer minimum value or based on a resultant waveform of the inner runout waveform and the outer runout waveform, depending on a result of the comparing step;
wherein in a wheel and tire assembly formed by combining the wheel and the tire, the assembly reference position of the wheel is matched with a position of a maximum radial force variation of the tire; and
wherein when both of the inner minimum value and the outer minimum value are greater than or equal to the runout reference value, the assembly reference position of the wheel is determined as a position of the minimum value of the resultant waveform of the inner runout waveform and the outer runout waveform.

2. The method of claim 1, wherein when both of the inner minimum value and the outer minimum value are less than the runout reference value, the assembly reference position of the wheel is determined as a position of a larger one of the inner minimum value and the outer minimum value.

3. The method of claim 1, wherein when only one of the inner minimum value and the outer minimum value is greater than or equal to the runout reference value, the assembly reference position of the wheel is determined as a position of a one of the inner minimum value and the outer minimum value which is greater than or equal to the runout reference value.

4. The method of claim 1, wherein for the runout reference value, an error function that is determined by reflecting an error of a measurement device that measures the inner runout and the outer runout is obtained; virtual wheel and tire assemblies are formed by combining several virtual wheel samples according to the error function with a predetermined tire model; and a simulation for obtaining radial force variations (RFVs) of the virtual wheel and tire assemblies is applied to all the virtual wheel and tire assemblies while a predetermined temporary runout reference value is changed, whereby the temporary runout reference value at which an average value of the RFVs of the virtual wheel and tire assemblies becomes minimum is determined as the runout reference value.

5. The method of claim 4, wherein the error function is obtained by: obtaining several inner minimum values obtained by measuring runout of several wheels through the measurement device and a standard deviation of phase angles thereof, outer minimum values and a standard deviation of phase angles thereof, and minimum values of the resultant waveforms and a standard deviation of phase angles thereof; showing all of the values on a coordinate plane composed of the magnitude of runout and a standard deviation of phase angles; and deriving a regression curve for points shown on the coordinate plane.

6. The method of claim 4, wherein the several virtual wheel samples are created as many as a predetermined number such that an average and a standard deviation of each of the inner minimum values and the outer minimum values follow normal distribution with predetermined reference average and reference standard deviation.

7. The method of claim 6, wherein in the several virtual wheel samples, the phase angles of the inner minimum values are fixed at 0° and the phase angles of the outer minimum values are randomly set within the range of 0°~360°.

8. The method of claim 7, wherein the several virtual wheel samples according to the error function have phase angles corrected by obtaining a standard deviation of phase angles, which are obtained by substituting runout of the virtual wheel samples into the error function, and then adding random phase angles, which are randomly determined within the standard deviation, to phases of the virtual wheel samples.

9. The method of claim 8, wherein the tire model for configuring the virtual wheel and tire assemblies by being combined with the virtual wheel samples has a constant reference RFV.

* * * * *